(12) United States Patent
Zou

(10) Patent No.: US 10,589,190 B2
(45) Date of Patent: Mar. 17, 2020

(54) ROTARY SOLID/FLUID COUNTER-CURRENT CONTACT APPARATUS

(71) Applicant: Baisheng Zou, Pearland, TX (US)

(72) Inventor: Baisheng Zou, Pearland, TX (US)

( * ) Notice: Subject to any disclaimer, the term of this patent is extended or adjusted under 35 U.S.C. 154(b) by 344 days.

(21) Appl. No.: 15/449,866

(22) Filed: Mar. 3, 2017

(65) Prior Publication Data
US 2018/0250608 A1 Sep. 6, 2018

(51) Int. Cl.
| | | |
|---|---|---|
| B01D 15/02 | (2006.01) | |
| B01D 15/36 | (2006.01) | |
| F28D 17/04 | (2006.01) | |
| B04B 5/06 | (2006.01) | |

(52) U.S. Cl.
CPC .......... *B01D 15/02* (2013.01); *B01D 15/361* (2013.01); *B04B 5/06* (2013.01); *F28D 17/04* (2013.01)

(58) Field of Classification Search
CPC ....... B01D 15/02; B01D 15/361; F28D 17/04; B04B 5/06
USPC ............... 494/22; 210/676, 264; 137/625.15, 137/625.21, 625.31
See application file for complete search history.

(56) References Cited

U.S. PATENT DOCUMENTS

| | | | | |
|---|---|---|---|---|
| 3,201,491 A * | 8/1965 | Broughton | ......... | B01D 15/1835 208/250 |
| 3,422,848 A * | 1/1969 | Carson | ................ | F16K 11/0743 137/625.15 |
| 3,706,812 A * | 12/1972 | Derosset et al. | .... | B01D 53/0423 208/310 R |
| 5,069,883 A * | 12/1991 | Matonte | ............ | B01D 11/0219 137/624.11 |
| 5,478,475 A * | 12/1995 | Morita | ................... | B01D 15/14 137/625.15 |
| 5,676,826 A * | 10/1997 | Rossiter | ................. | B01D 15/02 210/264 |
| 6,261,458 B1 * | 7/2001 | Callebert | ........... | B01D 15/1842 208/310 R |
| 6,431,202 B1 * | 8/2002 | Ahlgren | ............... | F16K 11/0743 137/312 |
| 6,527,946 B1 * | 3/2003 | Wijnberg | ................ | F16K 11/06 210/198.2 |
| 6,537,451 B1 * | 3/2003 | Hotier | ................ | B01D 15/1842 137/625.11 |
| 6,802,970 B2 * | 10/2004 | Rochette | ................. | B01J 47/00 210/264 |
| 6,904,936 B2 * | 6/2005 | Ma | ........................ | F16K 11/076 137/625.11 |

(Continued)

*Primary Examiner* — Charles Cooley
(74) *Attorney, Agent, or Firm* — Egbert Law Offices, PLLC

(57) ABSTRACT

A rotary counter-current solid/fluid contact apparatus is provided to enhance the efficiency of adsorption, ion exchange and regenerative heat exchange. The counter-current apparatus uses a rotor to direct fluids to multiple stationary columns, or multiple sections of a stationary column. By the action of the rotor, counter-current flows of a fluid phase and a solid phase can be achieved for a combined adsorption and desorption cycle, or a combined heating and cooling cycle. The apparatus allows not only countercurrent solid-fluid flows based on columns in series, but also countercurrent solid-fluid flows in the length of each individual column. The apparatus does not require a turntable to rotate multiple columns.

7 Claims, 6 Drawing Sheets

(56) References Cited

U.S. PATENT DOCUMENTS

| | | | | |
|---|---|---|---|---|
| 7,141,172 | B2 * | 11/2006 | Wang | B01D 15/1842 |
| | | | | 210/659 |
| 8,985,151 | B1 * | 3/2015 | Zou | F16K 11/00 |
| | | | | 137/580 |
| 9,120,049 | B2 * | 9/2015 | Sundaram | B01D 53/0446 |
| 2004/0099592 | A1 * | 5/2004 | Rochette | B01J 47/00 |
| | | | | 210/264 |
| 2012/0111435 | A1 * | 5/2012 | Antonetti | F16K 11/074 |
| | | | | 137/625 |
| 2018/0250608 | A1 * | 9/2018 | Zou | B01D 15/02 |
| 2018/0250609 | A1 * | 9/2018 | Zou | B01D 15/02 |

* cited by examiner

ROTARY SOLID/FLUID COUNTER-CURRENT CONTACT APPARATUS

CROSS-REFERENCE TO RELATED APPLICATIONS

The present application claims priority from U.S. Provisional Patent Application Ser. No. 62/298,419, filed on Feb. 22, 2016, and entitled "Rotary Solid/Fluid Counter-Current Contact Apparatus".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of rotary fluid distribution. More particularly, the present invention relates to rotors and matching columns that can be used to distribute fluid in regenerative heat exchangers and continuous countercurrent ion exchange and adsorption/desorption columns.

2. Description of Related Art Including Information Disclosed Under 37 CFR 1.97 and 37 CFR 1.98

The main bodies of certain classes of process equipment need to be regenerated or renewed after a certain time period of operation. Those equipment can include regenerative heat exchangers, regenerative thermal oxidizers, moving bed (simulated or real) chemical reactors/chromatographic separators, adsorption/desorption columns and regenerative air dehumidifiers. The regeneration methods include rotating the main body of the equipment or switching on and off a multitude of valves so that different sections of the main body can be contacted by different kinds of fluids at different times. The present invention attempts to optimize the operation of continuous countercurrent ion exchange and adsorption/desorption cycle, or regenerative countercurrent heat exchange cycle.

For continuous operations of mass transfer from one material to another, counter-current operation is more efficient than co-current or crossflow operations. The counter-current operation can be easily implemented if both materials are in fluid phases, since fluids can be pumped around easily.

If one material is a solid and another material is a fluid, counter-current flow becomes more difficult, since moving solid within a vessel or transporting solid from one vessel to another can present mechanical and efficiency problems.

U.S. Pat. No. 5,676,826 issued to Rossiter and Riley disclosed a fluid-solid contacting apparatus employing a rotary valve to conduct fluid streams to and from the apparatus. The fluid-solid contacting apparatus of such a design comprises a plurality of chambers containing solid, with chambers installed on a turntable. While such a design can achieve counter-current solid-fluid contact, a turntable loaded with chambers may cause mechanical difficulties when the size of chambers becomes large and heavy.

U.S. Pat. No. 6,431,202 describes a rotary valve with mechanical improvement over the apparatus of U.S. Pat. No. 5,676,826, but it still requires a turntable.

U.S. Pat. Application 20120111435 discloses a turntable-less rotary fluid distributor design which is however mechanically complex, and cumbersome for large fluid flows.

U.S. Pat. No. 8,985,151 discloses a rotary fluid distribution apparatus which does not require a turntable for fluid distribution and direction. However, the solid-fluid contact pattern disclosed are mainly crossflows, not counter-current flows.

Therefore, it is an object of the present invention to provide a simple fluid distribution apparatus with improvement over rotor designs of U.S. Pat. No. 8,985,151, and achieve true counter-current contact patterns for solid phases and fluid phases.

BRIEF SUMMARY OF THE INVENTION

The present invention is a rotary fluid distribution apparatus that comprises a top head having a wall extending around an interior volume thereof and having a first nozzle formed through the wall so as to open to the interior volume and a second nozzle formed through the wall so as to open to the interior volume. The top head has a first flow path and a second flow path opening to said interior volume. In additional to two nozzles, the top head also connects to the tops of multiple columns through external pipes.

A bottom head spaced relative to the top head is constructed similarly to the top head. Bottom head connects to the bottoms of multiple columns through external pipes. Top head, bottom head, columns and external pipes connecting columns to heads are stationary relative to earth.

A rotor extends through the interior volume of the said top and bottom head. The rotor has a top part, a middle part and a bottom part. Rotor rotates, distributes fluids to and receives fluids from various columns through various external and internal pipes.

The top part of the rotor has three separation plates that are positioned within the top head. The first separation plate separate a first fluid section from ambient air. The second separation plate has an opening formed there through. It separates the first fluid section and a second fluid section within the head. A third separation plate is positioned with the head in spaced relation to the second separation plate. The third separation plate has a first opening and a second opening. A tunneling internal feed pipe extends across the second fluid section and communicates to the opening of the second separation plate and one of the opening of third separation plates. The first separation plate and second separation plate confine the first fluid section, and second separation plate and third separation plate confine the second fluid section. The first fluid is able to pass from the first fluid section through the second fluid section via tunneling internal feed pipe, without mixing with the second fluid.

The bottom part of the rotor is constructed similarly to the top part of rotor and fits within the bottom head.

The middle part of the rotor contains multiple internal circulation pipes that are used to transfer fluids between columns. Those internal circulation pipes connect exit of one column to entrance of another neighboring column. The internal circulation pipes are tilted in two opposite directions, for the purpose of creating optimized countercurrent solid-fluid contacting.

The middle part of the rotor also contains internal feed pipes that connect to separation plates of the top and bottom parts of the rotor to provide feeds and withdraw products from the columns.

DETAILED DESCRIPTION

The rotor design of such a fluid distribution apparatus is similar to that of U.S. Pat. No. 8,985,151. The combination of the fluid distribution apparatus, interconnecting process pipes and multiple columns creates a system for countercurrent solid-fluid mass transfer or heat transfer operations.

The apparatus uses a solid to extract thermal energy or selected material from a process stream, and use a regeneration stream to regenerate the used solid. The thermal energy or selected material is transferred eventually from the process stream to the regeneration stream, with the solid as the transfer medium. The solid loaded columns are stationary. However, the rotary motion of a center rotor creates a simulated solid motion that makes solid-fluid counter-current flows possible.

Figure 1:
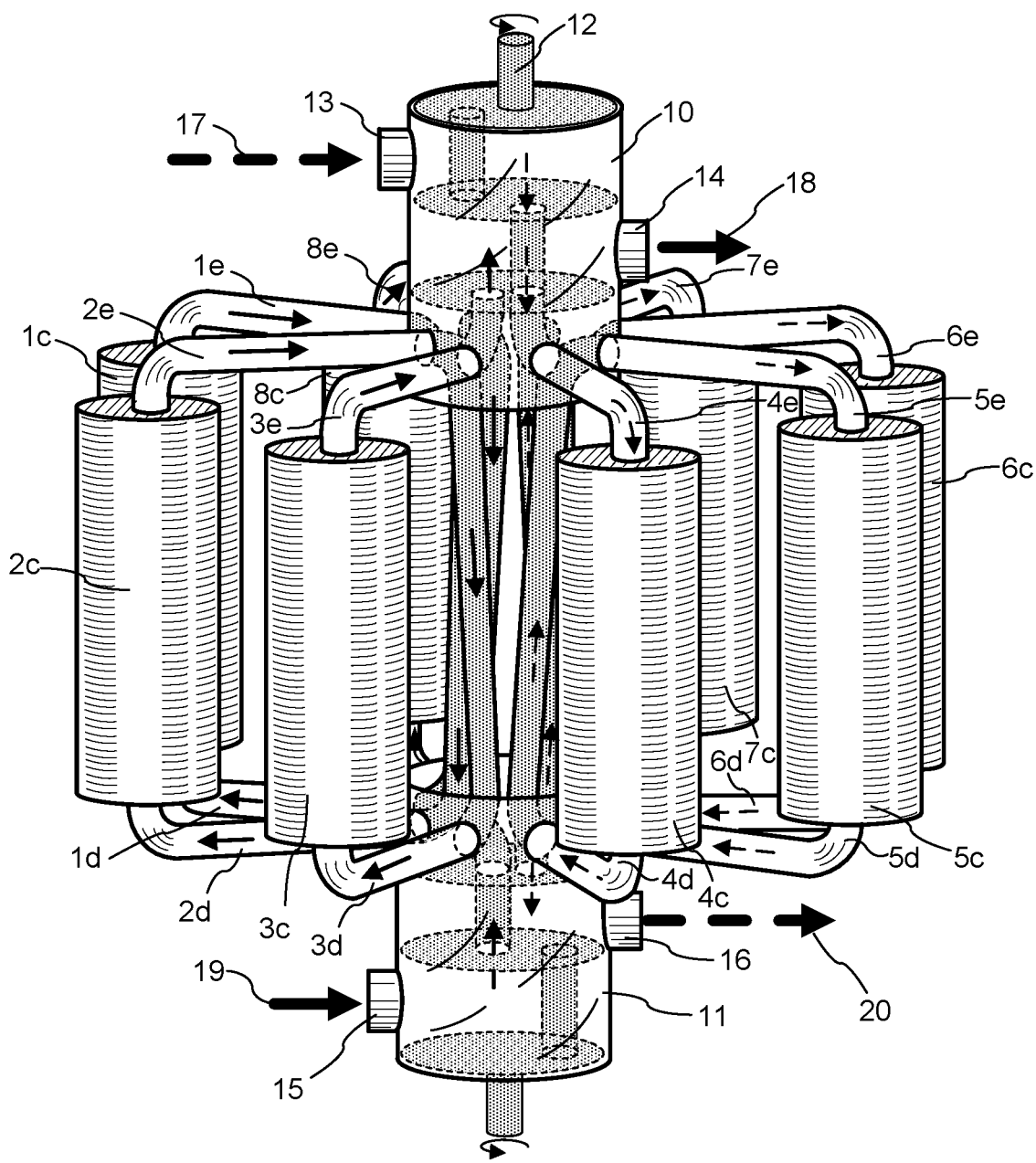
FIG. 1 is a perspective view of the countercurrent adsorption/heat transfer apparatus which comprises of a center rotor that rotates, and stationary parts that are fixed in position relative to earth.

Refer to FIG. 1, an apparatus comprises of multiple stationary parts and a rotor 12. When in operation, the stationary parts will be motionless and the rotor will rotate at a specified speed. The rotor 12 is shaded with darks dots to increase clarity.

The stationary parts shown in FIG. 1 comprise of a top head 10, a bottom head 11, multiple columns numbered from 1c to 8c, external pipes 1e to 8e connecting columns to top head 10, and external pipes 1d to 8d connecting columns to bottom head 11. Columns 1c to 8c are all packed with solid material (not shown for clarity) used as either thermal energy or mass transfer medium. The top and bottom heads have openings to connect to column inlets and outlets, and nozzles 13, 14, 15, 16 to connect to external process and regeneration streams.

Figure 2:
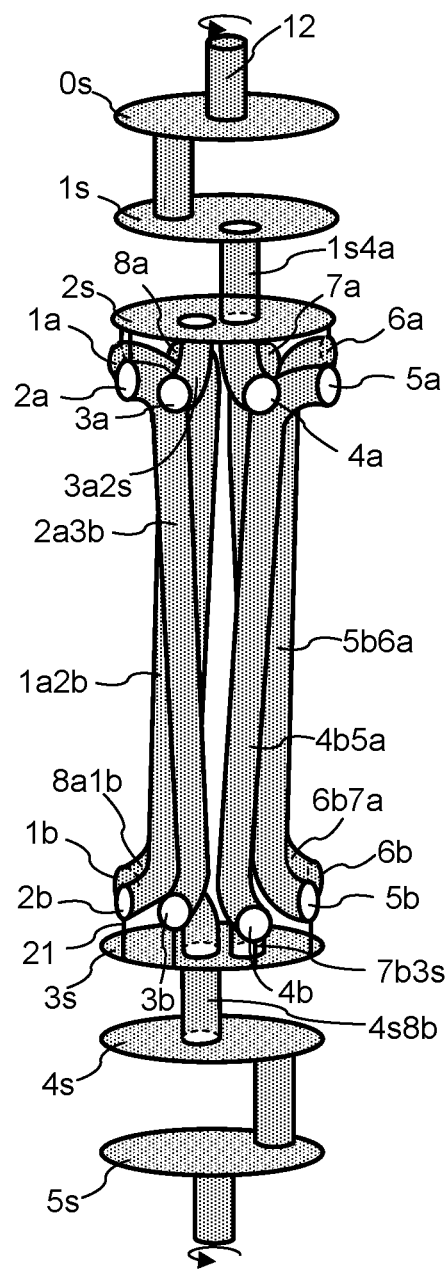
FIG. 2 is a perspective view of the rotor which includes multiple internal pipes and multiple separation plates. The internal pipes direct fluids to various columns. The separation plates prevent different fluids from mixing with each other while the rotor is in motion.

The rotor can be removed from the heads and is shown in FIG. 2. The rotor has many separation plates 0s, 1s, 2s, 3s, 4s, 5s. The separation plates separate different fluids when the latter are entering or leaving the apparatus. There are 8 pipe ends on upper section of the rotor numbered 1a to 8a; and there are 8 pipe ends on lower section of the rotor numbered 1b to 8b. Pipe end 1a is vertically aligned with 1b, so is 2a with 2b, 3a with 3b, etc. Pipe ends 1a to 8a and 1b to 8b are used to direct and withdraw fluids to and from various columns.

There are multiple internal circulation pipes of the said rotor that are used to direct or withdraw fluid from one pipe end to another pipe end. The internal circulation pipes are named based on their connecting pipe ends. For example pipe 2a3b connects pipe end 2a and pipe end 3b, and pipe 4b5a connects pipe end 4b and pipe end 5a, etc. The internal circulation pipe 2a3b allows fluid to flow from pipe end 2a to pipe end 3b. Since pipe end 2a and pipe end 3b are not vertically aligned, pipe 2a3b is tilted. Similarly, internal circulation pipe 4b5a directs flow from pipe end 4b to pipe end 5a. Multiple mechanic links 21 connect internal circulation pipes to separation plates so that all parts of the rotor can rotate simultaneously.

There are multiple internal feed pipes of the said rotor that feed fluids to or withdraw fluids from the columns. Internal feed pipes 4s8b and 1s4a are for fluids entering the columns, directing fluid flow from plate 4s to pipe end 8b and from plate 1s to pipe end 4a, respectively. Similarly internal feed pipes 3a2s and 7b3s allow fluids to leaving the columns.

Of the 8 pipe ends on the upper section of the said rotor, 6 pipe ends are for flows between columns (1a, 2a, 5a, 6a, 7a and 8a), two pipe ends are for flow entering or leaving the columns (3a and 4a). Of 8 pipe ends on the lower section of the said rotor, 1b, 2b, 3b, 4b, 5b and 6b are for flows between columns, 7b and 8b are for flows entering or leaving the columns.

FIG. 2 also shows that internal circulation pipes 8a1b, 1a2b, 2a3b are mirror images of pipes 6b7a, 5b6a, 4b5a, respectively, with the vertical mirror plane in the middle distance between 2a3b and 4b5a. Internal feed pipes 1s4a and 3a2s can be transformed to pipes 4s8b and 7b3s by a mirror operation with a horizontal mirror plane in the middle distance between plates 2s and 3s, and an 180° turn operation with the axis of separation plates.

Tilted internal circulation pipes allow flow in series from one column to another column. Internal circulation pipes 8a1b, 1a2b, 2a3b for the regeneration stream are tilted in opposite direction as that of internal circulation pipes 6b7a, 5b6a, and 4b5a for the process stream, based on the mirror image designs above. Such a design allows both countercurrent flow in a series of columns and countercurrent flow in the column length of each individual column, as will be described later.

Figure 3:
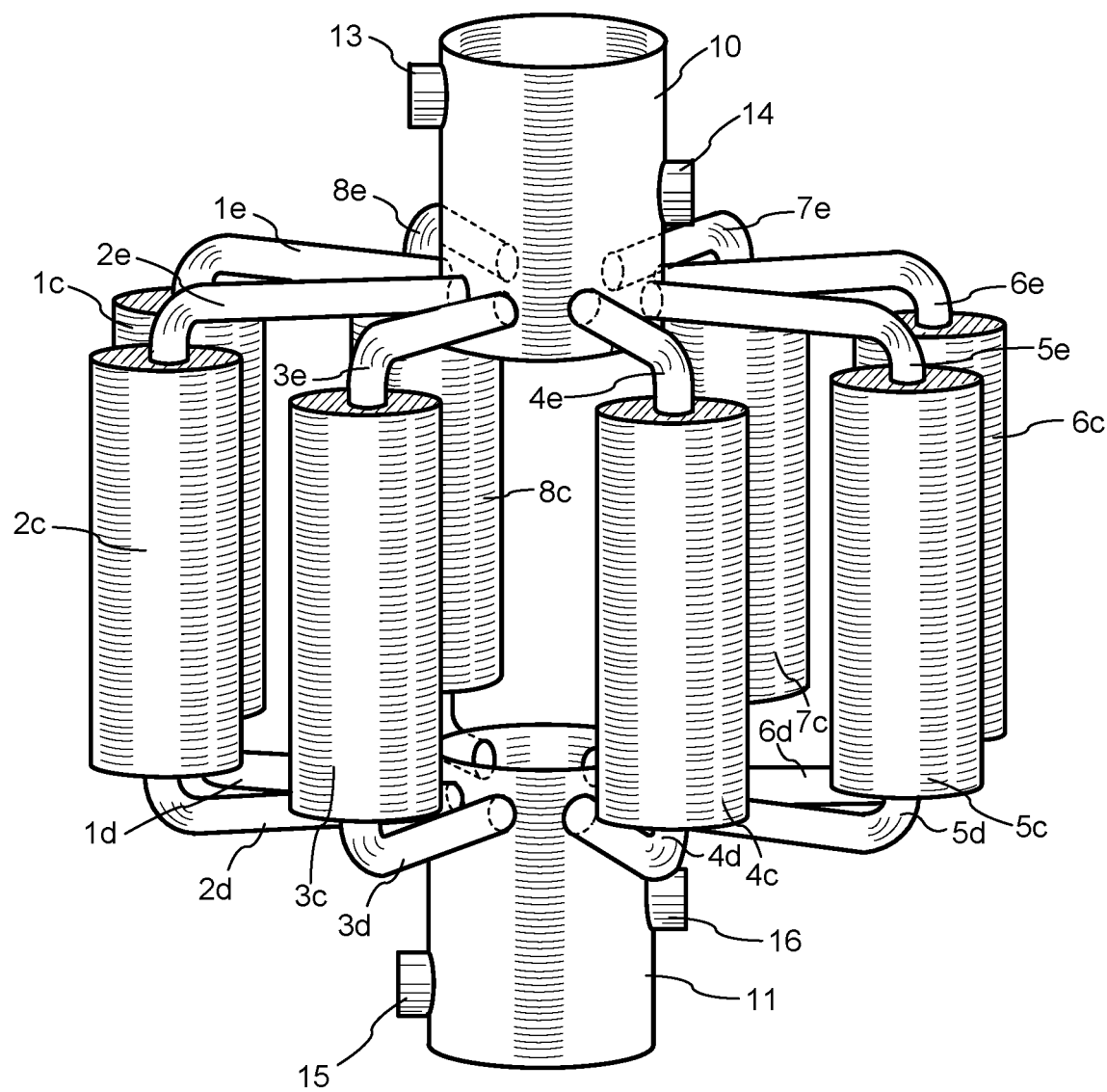
FIG. 3 is a perspective view of the stationary parts that include multiple columns, a top head and a bottom head, and pipes connecting columns to heads. Items in FIG. 2 and items in FIG. 3 combine together to make the apparatus in FIG. 1.

FIG. 3 shows a perspective view of the stationary parts, separated from the rotor.

Refer to FIG. 1 and FIG. 2, a process fluid stream 17 (dashed arrows) enters the apparatus through nozzle 13. The flow paths (dashed arrows) of the said process fluid are: nozzle 13, space between separation plates 0s and 1s, pipe 1s4a, pipe end 4a, pipe 4e, column 4c, pipe 4d, pipe end 4b, pipe 4b5a, pipe end 5a, pipe 5e, column 5c, pipe 5d, pipe end 5b, pipe 5b6a, pipe end 6a, pipe 6e, column 6c, pipe 6d, pipe end 6b, pipe 6b7a, pipe end 7a, pipe 7e, column 7c, pipe 7d, pipe end 7b, pipe 7b3s, space between separation plates 3s and 4s, and nozzle 16. The said process fluid goes through columns 4c, 5c, 6c and 7c sequentially and always in downward direction in the columns. The process stream exits the apparatus as stream 20.

A regeneration fluid stream 19 (solid arrow) enters the apparatus through nozzle 15. The flow paths (solid arrows) of the said regeneration fluid are: nozzle 15, space between separation plates 4s and 5s, pipe 4s8b, pipe end 8b, pipe 8d, column 8c, pipe 8e, pipe end 8a, pipe 8a1b, pipe end 1b, pipe 1d, column 1c, pipe 1e, pipe end 1a, pipe 1a2b, pipe end 2b, pipe 2d, column 2c, pipe 2e, pipe end 2a, pipe 2a3b, pipe end 3b, pipe 3d, column 3c, pipe 3e, pipe end 3a, pipe 3a2s, space between separation plates 1s and 2s, and nozzle 14. The said regeneration fluid goes through columns 8c, 1c, 2c and 3c sequentially and always in upward direction in the columns. The regeneration stream exits the apparatus as stream 18.

Figure 4:
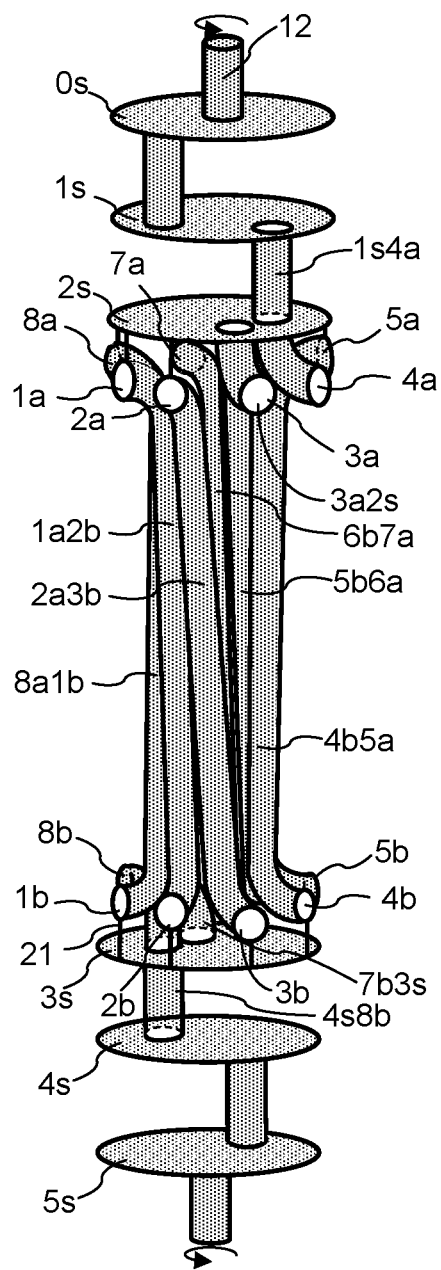
FIG. 4 is a perspective view of the rotor after the rotor rotates one 45° counter clockwise turn relative to FIG. 2.

After a fixed time interval of operation, the rotor is turned 45° counter clockwise viewing from top as shown by FIG. 4. For each 45° turn, a most loaded column is switched from adsorption to regeneration, and a most clean column is switched from regeneration to adsorption.

Refer to FIG. 3 and FIG. 4, a process fluid stream 17 (dashed arrows) enters the apparatus through nozzle 13. The flow paths (dashed arrows) of the said process fluid are: nozzle 13, space between separation plates 0s and 1s, pipe 1s4a, pipe end 4a, pipe 5e, column 5c, pipe 5d, pipe end 4b, pipe 4b5a, pipe end 5a, pipe 6e, column 6c, pipe 6d, pipe end 5b, pipe 5b6a, pipe end 6a, pipe 7e, column 7c, pipe 7d, pipe end 6b, pipe 6b7a, pipe end 7a, pipe 8e, column 8c, pipe 8d, pipe end 7b, pipe 7b3s, space between separation plates 3s and 4s, and nozzle 16. The said process fluid goes through columns 5c, 6c, 7c and 8c sequentially and always in downward direction in the columns. The process stream exits the apparatus as stream 20.

A regeneration fluid stream 19 (solid arrow) enters the apparatus through nozzle 15. The flow paths (solid arrows) of the said regeneration fluid are: nozzle 15, space between separation plates 4s and 5s, pipe 4s8b, pipe end 8b, pipe 1d, column 1c, pipe 1e, pipe end 8a, pipe 8a1b, pipe end 1b, pipe 2d, column 2c, pipe 2e, pipe end 1a, pipe 1a2b, pipe end 2b, pipe 3d, column 3c, pipe 3e, pipe end 2a, pipe 2a3b, pipe end 3b, pipe 4d, column 4c, pipe 4e, pipe end 3a, pipe 3a2s, space between separation plates 1s and 2s, and nozzle 14. The said regeneration fluid goes through columns 1c, 2c, 3c and 4c sequentially and always in upward direction in the columns. The regeneration stream exits the apparatus as stream 18.

An adsorption or ion exchange operation transfers targeted material from a process stream to a regeneration stream. The effectiveness of the operation is indicated by concentration levels in the feed/product streams. Column 4c, which has been in adsorption mode the longest and is the most saturated column in the previous period, is now switched to regeneration mode after a 45° rotor turn. It is contacted by a regeneration stream that has already contacted 3 columns (1c, 2c and 3c) and has highest concentration of targeted material for removal. The regeneration steam still exits the apparatus through pipe 3a2s and nozzle 14, before and after a rotor rotation.

Column 8c, which has been in regeneration mode the longest and is the most clean column in the previous period, is now switched to adsorption mode after a 45° turn. The process stream that has been adsorbed by 3 columns (5c, 6c and 7c) is further adsorbed by this cleanest column, and afterward it will exit the apparatus through the same pipe 7b3s and nozzle 16.

By continuously turning the rotor 45° at a fixed time interval for 8 times, each column will go through adsorption 4 times with increasing concentration of solute on its adsorbent, and desorption 4 times with decreasing concentration of solute on its adsorbent.

If the reference frame is chosen to rotate with the rotor, an observer on the rotor would observe counter-current flow of solid versus fluid both in the adsorption columns and in the regeneration columns. Such a countercurrent adsorption and desorption process is more efficient in terms of product purity and regeneration stream usage.

The system performance is further optimized since one stream is always up-flow inside columns and another stream is always down-flow inside columns. The countercurrent flow exists not only in terms of columns in series, but also exists in the length of each individual column.

The advantage of countercurrent flow in an individual column length can be illustrated by look at column 4c while the rotor turns from 0° to 45°. After 4 previous periods of adsorption, while the rotor is still at 0°, column 4c has the highest solute concentration overall among columns 4c, 5c, 6c and 7c in the adsorption series. Moreover, the top of column 4c has higher solute concentration than the bottom of column 4c does, since the process stream is down flow and enters the system with the highest solute concentration. Now the rotor makes a 45° turn, column 4c becomes the last column in the regeneration column series 1c, 2c, 3c and 4c. Since the regeneration stream is up flow, the highest solute concentration zone at the top of column 4c will be immediately regenerated, creating highest concentration of regeneration stream. However, if the regeneration stream was down flow through column 4c, the highest concentration zone would need to be purged from top of column 4c to bottom of column 4c, through the length of the column, before the solute can be desorbed out of the bottom of column 4c. Such an operation reduces the efficiency of operation and concentration of regeneration stream.

To make process streams flows in opposite direction of that of regeneration stream, internal circulation pipes for process stream should tilt in opposite direction as that of internal circulation pipes of regeneration stream, as described previously.

Such operation mechanisms are also applicable to regenerative heat transfer operation. A heat exchange operation transfers thermal energy from a process stream to a regeneration stream. The effectiveness of the operation is indicated by temperatures in the feed/product streams. By applying counter-current operation principles as described previously for adsorption/ion exchange, a regenerative heat exchanger of FIG. 1 design allows high exit temperature for the regeneration stream, and low exit temperature for the process stream, if transfer of thermal energy from process stream to regeneration stream is desired.

Figure 5:
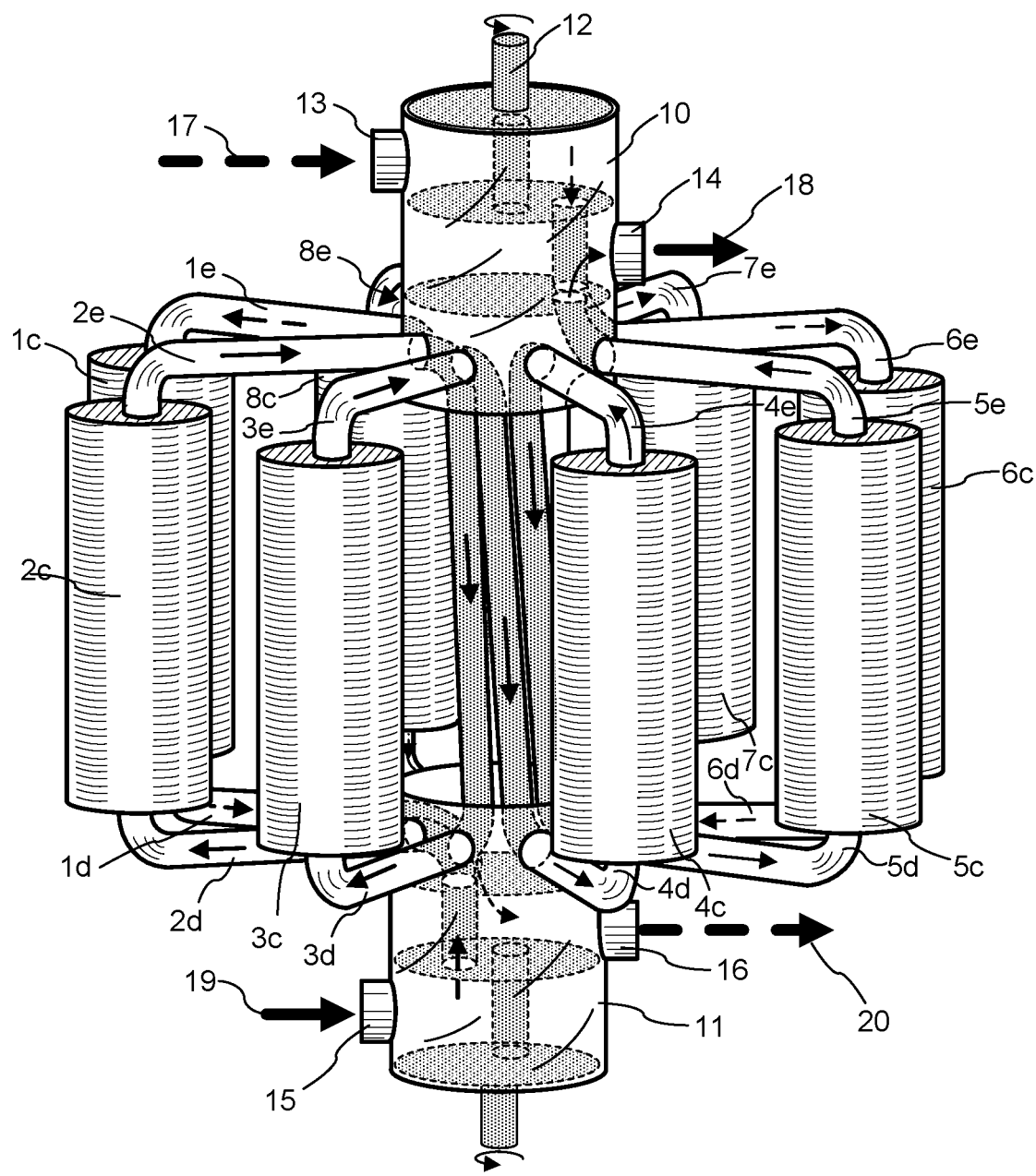
FIG. 5 is the whole apparatus after the rotor rotates two 45° (total 90°) counter clockwise turns relative to FIG. 2.
Figure 6:
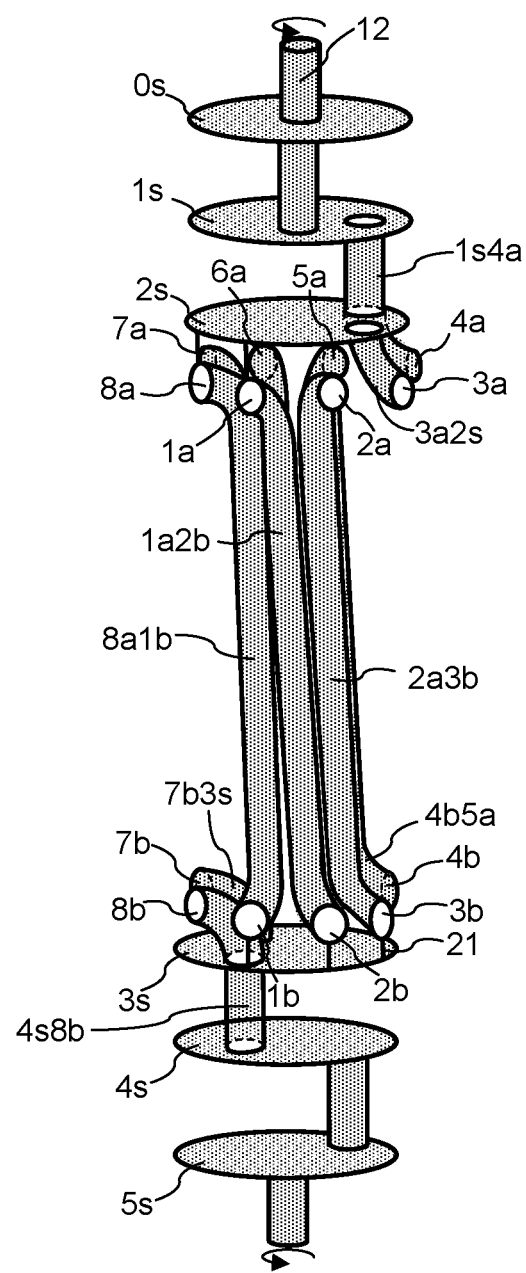
FIG. 6 is the rotor after two 45° (total 90°) counter clockwise turns. The said rotor is the same as what is shown in FIG. 5.

FIGS. 5 and 6 show the flow paths after two 45° turns from FIGS. 1 and 2. The process fluid 17 is treated with 4 columns in the back (6c, 7c, 8c, 1c) while the regeneration fluid 19 works in the front with columns 2c, 3c, 4c, 5c.

The rotor position and flow directions are shown by FIG. 5 and FIG. 6. The flow paths (dashed arrows) of process fluid 17 are: nozzle 13, space between separation plates 0s and 1s, pipe 1s4a, pipe end 4a, pipe 6e, column 6c, pipe 6d, pipe end 4b, pipe 4b5a, pipe end 5a, pipe 7e, column 7c, pipe 7d, pipe end 5b, pipe 5b6a, pipe end 6a, pipe 8e, column 8c, pipe 8d, pipe end 6b, pipe 6b7a, pipe end 7a, pipe 1e, column 1c, pipe 1d, pipe end 7b, pipe 7b3s, space between separation plates 3s and 4s, nozzle 16 and the system exit. The said process fluid goes through columns 6c, 7c, 8c and 1c sequentially and always in downward direction in the columns.

The flow paths (solid arrows) of the regeneration fluid 19 are: nozzle 15, space between separation plates 4s and 5s, pipe 4s8b, pipe end 8b, pipe 2d, column 2c, pipe 2e, pipe end 8a, pipe 8a1b, pipe end 1b, pipe 3d, column 3c, pipe 3e, pipe end 1a, pipe 1a2b, pipe end 2b, pipe 4d, column 4c, pipe 4e, pipe end 2a, pipe 2a3b, pipe end 3b, pipe 5d, column 5c, pipe 5e, pipe end 3a, pipe 3a2s, space between separation plates 1s and 2s, nozzle 14 and the system exit. The said regeneration fluid goes through columns 2c, 3c, 4c and 5c sequentially and always in upward direction in the columns.

Columns denoted with Ic, external pipes denoted with Ie and Id are stationary relatively to earth, but fluid streams flow through them are changing as a function of rotor rotation. Internal pipes of the rotor denoted with IsIIa(b), Ia(b)IIs, IaIIb or IbIIa, and internal pipe ends denoted with Ia or Ib are rotating relative to earth, but fluids flow through them are always in constant sequences. Here I and II denote numerical number between 1 and 8.

In fact, the flow paths (dashed arrows) of process fluid 17 can be described for any rotational position as follows: nozzle 13, space between separation plates 0s and 1s, pipe 1s4a, pipe end 4a, pipe Ie, column Ic, pipe Id, pipe end 4b, pipe 4b5a, pipe end 5a, pipe (I+1)e, column (I+1)c, pipe (I+1)d, pipe end 5b, pipe 5b6a, pipe end 6a, pipe (I+2)e, column (I+2)c, pipe (I+2)d, pipe end 6b, pipe 6b7a, pipe end 7a, pipe (I+3)e, column (I+3)c, pipe (I+3)d, pipe end 7b, pipe 7b3s, space between separation plates 3s and 4s, and nozzle 16. The said process fluid goes through columns Ic, (I+1)c, (I+2)c and (I+3)c sequentially and always in downward direction in the columns. The process stream exits the apparatus as stream 20.

The flow paths (solid arrows) of regeneration fluid 19 are: nozzle 15, space between separation plates 4s and 5s, pipe 4s8b, pipe end 8b, pipe (I+4)d, column (I+4)c, pipe (I+4)e, pipe end 8a, pipe 8a1b, pipe end 1b, pipe (I+5)d, column (I+5)c, pipe (I+5)e, pipe end 1a, pipe 1a2b, pipe end 2b, pipe (I+6)d, column (I+6)c, pipe (I+6)e, pipe end 2a, pipe 2a3b, pipe end 3b, pipe (I+7)d, column (I+7)c, pipe (I+7)e, pipe end 3a, pipe 3a2s, space between separation plates 1s and 2s, and nozzle 14. The said regeneration fluid goes through columns (I+4)c, (I+5)c, (I+6)c and (I+7)c sequentially and always in upward direction in the columns. The regeneration stream exits the apparatus as stream 18.

Number I can take the values from 1 to 8. Since the column number cannot exceed 8 for this particular example, a value of (I+1) to (I+7) really means sequentially increasing numbers not to exceed 8, i.e., the number right after 8 must be dropped back to 1, and the series starts over again.

Instead of multiple columns, the apparatus could also be constructed with a single large column with multiple sections. The sections are separated by plates in radial direction. The rotor, connection pipe ends, internal and external pipes are also of the same design as the case of multiple columns.

I claim:

1. A rotary solid/fluid counter-current contact apparatus comprising:
    a plurality of external columns having solids therein for mass or heat transfer;
    a top head having a wall extending around an interior volume thereof, said wall having a first orifice formed through said wall so as to open to said interior volume and a second orifice formed through said wall so as to open to said interior volume, said top head having a first flow path and a second flow path communicating with said interior volume thereof, said top head having a plurality of openings corresponding to positions of said plurality of external columns, said plurality of openings being in fluid communication with respective upper ends of said plurality of external columns;
    a bottom head having a wall extending around an interior volume thereof, said wall having a first orifice formed through said wall so as to open to said interior volume of said bottom head, and a second orifice formed through said wall so as to open to said interior volume of said bottom head, said bottom head having a first flow path and a second flow path communicating with said interior volume thereof; said bottom head having a plurality of openings corresponding to positions of said plurality of external columns, said plurality of openings being in fluid communication with respective lower ends of said plurality of external columns; and
    a rotor extending through the respective interior volumes of said top head and said bottom head, said rotor having an axis of rotation, said rotor comprising:
        a top part positioned within said top head, said top part having a first separation plate, a second separation plate and a third separation plate, said first separation plate and said second separation plate defining a first fluid section, said second separation plate and said third separation plate defining a second fluid section, wherein a tunneling internal feed pipe extends between an opening in said second separation plate and a first opening in said third separation plate, said third separation plate having a second opening there through;
        a bottom part positioned within said bottom head, said bottom part having a first separation plate, a second separation plate and a third separation plate, said first separation plate and said second separation plate defining a first fluid section, said second separation plate and said third separation plate defining a second fluid section, wherein a tunneling internal feed pipe extends between an opening in said second separation plate and a first opening in said third separation plate, said third separation plate having a second opening there through; and
        a middle part comprising a plurality of internal circulation pipes and a plurality of internal feed pipes, each of said plurality of internal circulation pipes being in fluid communication with one of said plurality of openings of said top head and one of said plurality of openings of said bottom head, each of said plurality of internal circulation pipes being tilted with respect to said axis of rotation of said rotor so as to be in fluid communication with an upper end of one of said plurality of external columns and with a lower end of an adjacent one of said plurality of external columns, each of said plurality of internal feed pipes being in fluid communication with one of said plurality of external columns and also with one of the flow paths of the first head and the second head.

2. The apparatus of claim 1, further comprising:
    a first plurality of external pipes each having a first end connected to one of said plurality of openings of said top head, and a second end connected to an upper end of one of said plurality of external columns; and
    a second plurality of external pipes each having a first end connected to one of said plurality of openings of said bottom head, and a second end connected to a lower end of one of said plurality of external columns.

3. The apparatus of claim 1, said first separation plate of said top part separating said first fluid section of said top part from ambient air, said third separation plate of said top part separating said second fluid section of said top part from ambient air.

4. The apparatus of claim 1, wherein rotation of said rotor can direct a fluid to said external columns sequentially, so as to result in counter-current contacting of said solids with a process stream and with a regeneration stream.

5. The apparatus of claim 1, said plurality of internal circulation pipes comprising:
- a first plurality of internal circulation pipes tilted with respect to said axis of rotation of said rotor in a first direction; and
- a second plurality of internal circulation pipes tilted with respect to said axis of rotation of said rotor in a second direction opposite said first direction such that said second plurality of internal circulation pipes are a mirror image of said first plurality of internal circulation pipes, wherein one of said first and second pluralities of internal circulation pipes is oriented to pass a fluid in a downward direction through the external columns and wherein another of said first and second pluralities of internal circulation pipes is oriented to pass a fluid in an upward direction through the external columns.

6. The apparatus of claim 1, said plurality of internal feed pipes comprising:
- a first internal feed pipe extending between said tunneling internal feed pipe of said top head and one of said plurality of openings of said top head, so as to pass fluid between said first fluid section of said top head and one of said plurality of external columns; and
- a second internal feed pipe extending between said tunneling internal feed pipe of said bottom head and one of said plurality of openings of said bottom head, so as to pass fluid between said first fluid section of said bottom head and one of said plurality of external columns.

7. The apparatus of claim 6, further comprising:
a third internal feed pipe extending between said second opening of said third separation plate of said top part of said rotor and one of said plurality of openings of said top head, so as to pass fluid between said second fluid section of said top head and one of said plurality of external columns; and
a fourth internal feed pipe extending between said second opening of said third separation plate of said bottom part of said rotor and one of said plurality of openings of said bottom head, so as to pass fluid between said second fluid section of said bottom head and one of said plurality of external columns.

\* \* \* \* \*